US012628833B2

(12) United States Patent
Brébion et al.

(10) Patent No.: US 12,628,833 B2
(45) Date of Patent: May 19, 2026

(54) COMPOSITION AND METHOD FOR IMPROVING PLANT GROWTH

(71) Applicant: ALGAIA, Lannilis (FR)

(72) Inventors: Jérémy Brébion, Cheux (FR); Franck Hennequart, Hérouville-Saint-Clair (FR)

(73) Assignee: ALGAIA, Lannilis (FR)

( * ) Notice: Subject to any disclaimer, the term of this patent is extended or adjusted under 35 U.S.C. 154(b) by 1188 days.

(21) Appl. No.: 17/620,215

(22) PCT Filed: Jun. 17, 2020

(86) PCT No.: PCT/EP2020/066766

§ 371 (c)(1),
(2) Date: Dec. 17, 2021

(87) PCT Pub. No.: WO2020/254407

PCT Pub. Date: Dec. 24, 2020

(65) Prior Publication Data

US 2022/0242800 A1      Aug. 4, 2022

(30) Foreign Application Priority Data

Jun. 18, 2019    (FR) ....................................... 1906513

(51) Int. Cl.
*A01N 65/03*          (2009.01)
(52) U.S. Cl.
CPC ................................... *A01N 65/03* (2013.01)
(58) Field of Classification Search
CPC ................................. A01N 65/03; C05F 17/00
See application file for complete search history.

(56) References Cited

FOREIGN PATENT DOCUMENTS

| EP | 0218770 | A1 | 4/1987 |
| EP | 0538091 | A1 | 4/1993 |
| FR | 3025699 | A1 | 3/2016 |
| GB | 2408045 | A | 5/2005 |
| JP | 2017226548 | A | 12/2017 |
| WO | 1994000993 | A1 | 1/1994 |
| WO | 1998041091 | A1 | 9/1998 |
| WO | 2004082380 | A1 | 9/2004 |
| WO | 2004082381 | A1 | 9/2004 |
| WO | 2016038320 | A1 | 3/2016 |

OTHER PUBLICATIONS

Kadam et al. "Extraction, structure and biofunctional activities of laminarin from brown algae", Int'l J Food Sci Tech, Jan. 2015, vol. 50, Iss 1, 24-31. (Year: 2015).*
Black et al., "Manufacture of algal chemicals", III. Laboratory-scale isolation of laminarin from brown marine algae, J App. Chem, Nov. 1951, 505- 517. (Year: 1951).*
International Search Report and Written Opinion issued on Sep. 4, 2020 for corresponding PCT Application No. PCT/EP2020/066766.
Abdel-Fattah, A. F. et al., "Composition of some brown algae as influenced by seasonal variation," Phytochemistry, vol. 9, No. 4, 1970, pp. 721-724 XP002797985.
Wajahatullah, Khan et al., "Seaweed Extracts as Biostimulants of Plant Growth and Development," Journal of Plant Growth Regulation, vol. 28, No. 4, 2009, pp. 386-399 XP055133661.

* cited by examiner

*Primary Examiner* — Gina C Justice
(74) *Attorney, Agent, or Firm* — POLSINELLI PC

(57)          ABSTRACT

The invention relates to a biostimulant composition containing an extract of brown algae and its use for improving plant growth by stimulating the growth of favorable microorganisms present in soils.

12 Claims, 5 Drawing Sheets

COMPOSITION AND METHOD FOR IMPROVING PLANT GROWTH

CROSS-REFERENCE TO RELATED APPLICATIONS

Figure 1:
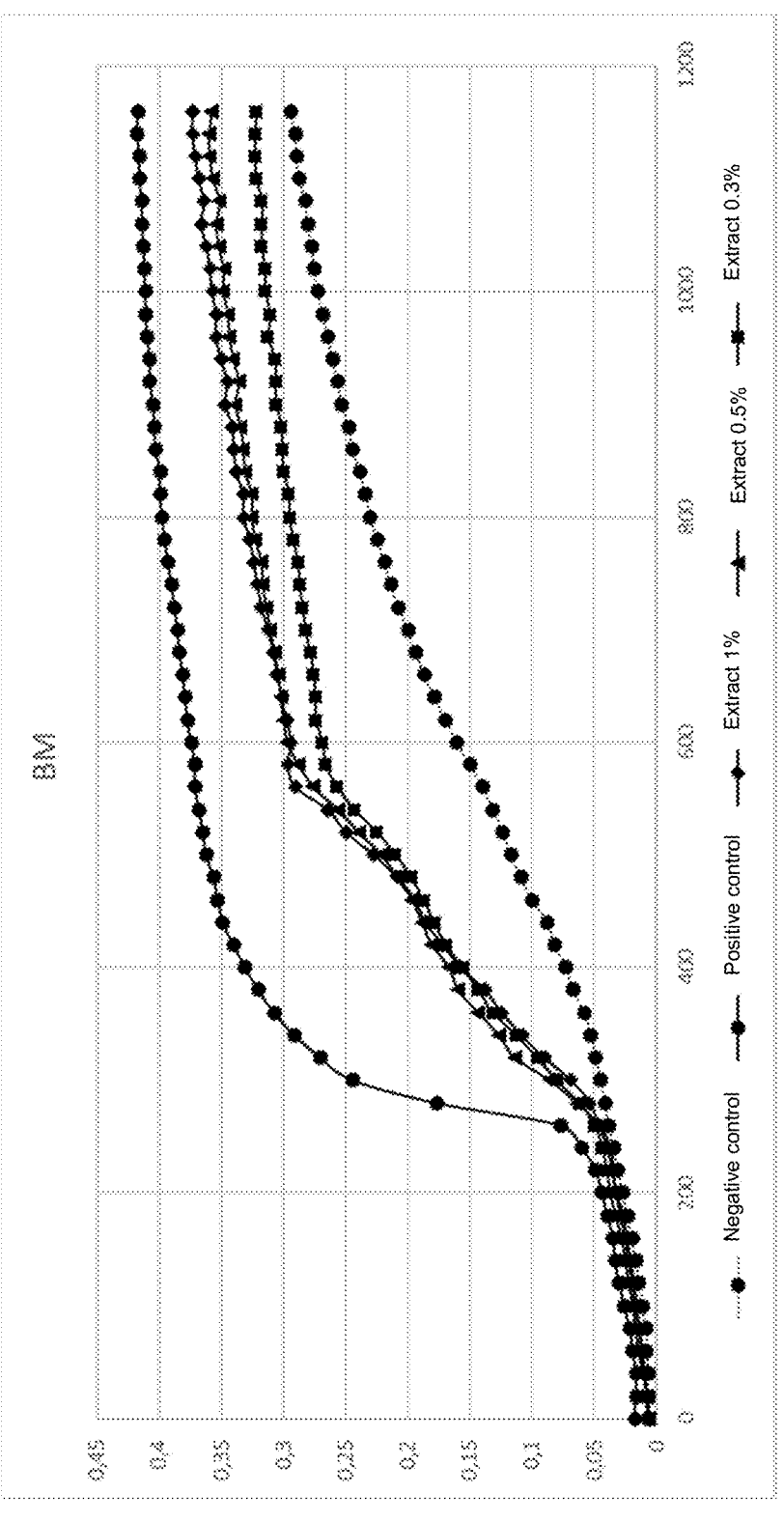

This application is a national stage application (under 35 U.S.C. § 371) of PCT/EP2020/066766, filed Jun. 17, 2020, which claims benefit of French Application No. 1906513, filed Jun. 18, 2019, which are incorporated herein by reference in their entireties.

The invention relates to a composition containing a brown algae extract and its use as a biostimulant for stimulating plant growth by stimulating the growth of certain bacteria having a beneficial effect on plants.

There is currently a need to develop new products to increase crop yields while reducing the impact on the environment. The nature of the fauna and flora of agricultural soils is important for these issues, and in particular the presence of certain micro-organisms that improve soil fertility or reduce the toxicity of heavy metals such as nickel and cobalt. These micro-organisms can be destroyed by current phytosanitary products (weed killers, fungicides or herbicides).

The bacteria *Bacillus megaterium*, for instance, allows better solubility of phosphorus, and nitrogen fixation in soils is facilitated by *Rhizobium leguminosarum* or *Azotobacter vinelandii*. However, there are different types of soils that are not made up of the same microbial populations with a diversity and abundance that can differ greatly.

It is therefore necessary to identify products of natural origin that can be adapted to different types of soil, i.e. that can act on different types of micro-organisms.

According to a definition validated by the European Commission, biostimulants are defined as substance(s) and/ or micro-organism(s) whose function, when applied to plants or to the rhizosphere, is the stimulation of natural processes that promote/improve nutrient uptake or utilization, tolerance to abiotic stresses, crop quality or yield, independently of the presence of nutrients.

Thus, the action of the biostimulant is not only linked to its composition, but also to the effect it will have on the plant as such or its environment.

Some seaweed extracts, particularly from brown algae of the genus *Fucus*, are available for sale as biostimulants. A majority of the formulations come from *Ascophyllum nodosum*, the extraction techniques being variable. The active ingredients present in seaweed-based biostimulants are generally similar but their composition and functionality depend on the nature of the raw material, as well as on the extraction method.

FR3025699A describes a concentrated seaweed extract, a process for its preparation and its uses as a liquid fertilizer or in seed coating. The extract is obtained by grinding seaweed until cell rupture, homogenizing the grind in aqueous solution, separating alginate and cellulose by flocculation and filtration, adjusting the pH and concentrating to obtain a percentage of dry matter between 6% and 100%. This extract is indicated as being directly effective on plants, and it is not specified that it can have a positive effect on soil bacteria advantageous to increasing yield. Moreover, the described process differs from the process mentioned in the present application by the absence of a suspension step in an acid medium, or by the absence of flocculation of alginate and cellulose fibers as mentioned in FR30255699A. The extracts obtained by the process of FR3025699A do not contain the same proportions of active principles as those described in the present application.

JP2017226548A describes a powder of brown algae, such as *laminaria* algae. This powder is obtained by grinding the seaweed. It is then resuspended in an organic acid and used as a fertilizer. This document does not mention the fact that the composition used can have an effect on soil bacteria. Furthermore, the process described in this document does not include an extraction step, and the composition is therefore not an extract concentrated in the various active components. In particular, because the composition of this document is a whole seaweed powder, the concentrations of mannitol, laminarans and fucoidans are lower than those described below. The powder of this document also contains non-soluble elements such as cellulose.

Abdel Fattah et al (Phytochemistry, Volume 9, Issue 4, 1970, p 721-724) refers to the composition of brown algae. He discloses that *laminaria* algae contain laminarans and mannitol in a wide range of proportions and that these change with the seasons (Table 1). This document does not describe the specific composition, which goes beyond the simple purification of seaweed compounds, and which contains specific percentages of each of the components as described in the present application, nor the fact that such a composition can be used to promote the growth of soil bacteria.

GB2408045A describes a process for obtaining algae extracts, which differs from the processes described in the present application in terms of pH, time, temperatures, pressure. Indeed, it appears (page 8, line 1, or page 12, lines 6-17) that the time of exposure to acid is less than one hour. Furthermore, this document refers to a "soil conditioning composition", obtained by alkaline extraction. This composition does not contain the same concentrations of the components of interest as those listed below.

Khan et al (JOURNAL OF PLANT GROWTH REGULATION, vol. 28, no. 4, 2009, p 386-399) is a review relating to the use of algae as biofertilizers, and discussing the active elements present in these algae. This paper does not mention the particular extracts, nor the processes described below.

The invention relates to a new brown algae extract, which has advantageous properties for the growth of bacteria generally present in soils. Thus, this algae extract can be used as a biostimulant, by application to the growing medium or soils, in order to allow a better growth of plants, thanks to the favorable bacteria stimulated by this extract. It can be integrated in a biostimulant composition, with excipients or other active ingredients. The extract can also be used in a biocontrol composition, in which the extract is combined with PGPR bacteria (acronym for Plant Growth Promoting Rhizobacteria), in order to stimulate the growth of these bacteria.

This extract was obtained by acid extraction of a brown algae mill, preferably followed by filtration of the recovered retentate.

This extract contains elements that stimulate the growth of bacteria that promote plant growth, in particular *Bacillus megaterium, Pseudomonas fluorescens, Pseudomonas fulva* and *Arthrobacter agilis*. These bacteria have a PGPR (Plant-Growth Promoting Rhizobacteria) effect, i.e. they are bacteria that colonize the roots of plants and promote their growth.

The invention thus relates to an extract of brown algae, characterized in that it comprises between 15 and 25% mannitol, between 35 and 45% laminarans and between 20 and 30% fucoidans. The other compounds present (generally between 10 and 15%) in this extract are various compounds, particularly inorganic compounds (or organic compounds, particularly polysaccharides such as alginic acid or alginates). As indicated in the examples, the percentages are expressed by weight with respect to the dry matter.

More generally, the invention relates to a composition comprising between 15 and 25% mannitol, between 35 and 45% laminarans and between 20 and 30% fucoidans, and preferably between 5 and 20% other organic or inorganic compounds (in particular alginates/alginic acid, and/or peptides and/or amino acids and/or lipids and/or minerals), preferably between 10 and 15% of these other compounds. If the composition does not contain any other compounds, it preferably comprises between 19 and 31% mannitol, between 39 and 56% laminarans and between 22 and 33% fucoidans, and 0% other compounds, in order to maintain the ratios between compounds below.

The Laminarans/Mannitol ratio is generally between 1,8 and 2,3. The ratio of Laminarans to Fucoidans is generally between 1,5 and 2. The ratio of fucoidans to mannitol is generally between 1,2 and 1,5.

Preferably, the brown algae used are *laminaria* algae, i.e. algae of the genus *Laminaria*. In particular, *Laminaria hyperborea* or *Laminaria digitata* are used. However, other types of brown algae may be used, in particular *Laminaria japonica, Sargassum* sp., *Ecklonia maxima, Fucus* sp., *Lessonia* sp., and *Macrocystis* sp.

In another embodiment, the brown algae are of the genus *Fucus*. In another embodiment, the brown algae are of the genus *Ascophyllum*.

Mixtures of these brown algae can also be used.

In a preferred embodiment, the brown algae extract comprises between. 20 to 23% mannitol, between 39 and 42% laminarans and between 20 and 25% fucoidans. Preferably, it also contains between 10 and 12% inorganic compounds.

In a preferred embodiment, the extract is in the form of a liquid extract (preferably on an aqueous basis) without suspended elements, an aqueous solution or a powder form soluble in an aqueous medium. The aqueous medium is preferably water.

In the preferred embodiment, the brown algae extract is obtainable by a method as described below, which is also part of the invention.

The brown algae extract is obtained by an extraction method. This method includes the steps of
   a. Grinding of a brown algae sample,
   b. Suspension of the ground material in an acidic solution for a period of more than 2 hours
   c. Recovery of the liquid fraction, preferably by centrifugation or filtration.
The process may also include the further steps of
   d. Generation of a precipitate by adding alcohol to the liquid fraction recovered in c,
   e. Recovery of precipitate
   f. Suspension of the precipitate in an aqueous solution, drying and/or freeze-drying of the precipitate.
Alternatively, this method may include the further steps of:
   d. Filtration of the liquid fraction recovered in c,
   e. Recovery of the retentate after filtration
   f. Suspension of the retentate in an aqueous solution, drying and/or freeze-drying of the retentate.
The brown algae sample may be a fresh algae sample, i.e. harvested and not subjected to a drying step. If such a sample is to be used, it is preferable that the algae be harvested no more than 24 hours before use. This is because there is a risk of degradation of the active compounds in a sample of fresh, undried seaweed if the sample is used after several days. If the extract is to be prepared after the algae have been harvested, it is preferable to dry the algae in order to limit the alteration of their active ingredients. This drying step can be carried out by any method known in the art, in particular at low temperature just after harvesting, which makes it possible to best preserve the biochemical conformation of active compounds and thus their functionality. Dry algae are therefore preferentially used.

The sample is ground, for example, using a conventional grinder/micronizer to obtain a particle size in the order of a millimeter.

After grinding the algae sample, the grind is suspended in an acidic solution. This acidic solution preferably has a pH of less than or equal to 5, preferably less than or equal to 4, most preferably less than or equal to 3. Preferably a weak carboxylic acid is used, having in particular from 4 to 8 carbon atoms, and from one to three acid functions. Particularly preferred are acids having a main carbon chain of 4 to 6 carbon atoms and 2 or 3 acid functions. In particular, citric acid ($C_6H_8O_7$, CAS 77-92-9 (anhydrous) or 5949-29-1 (monohydrate)) or isocitric acid (CAS 320-77-4) is used. However, strong dilute acids, in particular sulfuric acid or phosphoric acid, may also be used.

Incubation of the brown algae sample grind is carried out for at least two hours, but may be extended. However, it is preferred that this incubation is carried out for a maximum of 6 hours, preferably about 3 hours (i.e., between 2 h 45 and 3 h 15 or between 2 h 50 and 3 h 10, or between 2 h 55 and 3 h 05). In a particular embodiment, this incubation is performed at room temperature. In another embodiment, the incubation is carried out at a temperature between 55° C. and 80° C., in particular between 65° C. and 75° C.

The liquid extract is then recovered after incubation. The solid fraction can be removed by centrifugation (which is the preferred method) or by filtration with a cut-off at 200 μm maximum.

In a preferred embodiment, the recovered acidic liquid extract is subjected to a additional active ingredient extraction step. In this embodiment, active ingredient precipitation is induced by adding an alcohol solution to the liquid extract and recovering the precipitate. The alcohol is preferably ethanol or isopropanol. In particular, the alcohol precipitation step can be carried out with an alcohol at a temperature of the order of −20° C. to 0° C. The alcohol used is generally pure (absolute alcohol).

The resulting precipitate can then be dried, freeze-dried, or resuspended in an aqueous solution.

Alternatively, a filtration step can be carried out (in particular ultrafiltration or membrane filtration) with a cut-off of 20 kDa (only the elements lower than 20 kDa pass through the membrane), possibly 25 kDa or even 30 kDa. The retentate (fraction that did not pass through the pores of the membrane) is recovered, and can be dried, freeze-dried, or kept in suspension in an aqueous solution.

Without being bound by this theory, it is assumed that the extraction process makes it possible to obtain optimal concentrations of beneficial active ingredients in the extract obtained, as well as ratios between the various active compounds that make it possible to obtain a synergistic effect on bacterial growth, as shown in the examples. Thus, the extraction process allows to increase the content of laminarans and mannitol in the obtained extracts, which seems to be positive for the effects on the growth of bacteria.

The invention thus relates to an extract of brown algae, obtainable by a process as described above.

The brown algae extracts thus obtained have a composition as defined above.

They may be mixed with any acceptable excipient for use in agriculture, i.e. compatible in its application to plants and acceptable to the latter. One may thus cite an excipient chosen from solvents, surfactants, adhesives, emulsifying agents, stabilizers, fillers, in particular mineral fillers, thinners, thickeners, anti-wash agents.

The invention thus relates to a formulation or composition containing the brown algae extract described above, and which may thus further comprise suitable carriers, diluents and/or excipients, as well as to the use of such a brown seaweed extract for the preparation of a biostimulant or fertilizing composition. This composition is biostimulating or fertilizing in that it has such a biostimulating or fertilizing effect on the soil. In particular, it is believed that soil fertilization is related to the ability of the formulation to stimulate the growth of bacteria beneficial to plants.

By way of illustration, mention may be made, as carriers, diluents and/or excipients, of salts such as potassium chloride, potassium sulphate, potassium sorbate, potassium citrate, sodium sulphate, sodium metabisulphite, sodium citrate, calcium carbonate, calcium benzoate, calcium phosphate. Other elements such as maltodextrin, gypsum or bentonite, alcohols such as ethanol, butanol, isopropyl alcohol, acids such as acetic acid, lactic acid can also be used. Combinations of these elements can also be used.

In a preferred embodiment, the formulation is in liquid form.

In another embodiment, the formulation is in a solid form, such as in a paste or shell for coating or pelliculating seeds. Thus, the brown algae extract can be used for seed treatment. A seed treatment product is formulated by adding the brown seaweed extract to formulants, adjuvants, pelliculants known in the art. These compounds have no biological effect and are used in particular to ensure that the active substance remains on the seed and that the seed is well covered. Thus, the coating is carried out by mixing the brown algae extract with a formulant and/or a coating agent. The mixture is then sprayed onto the seed for application to the seed, after which homogenization is usually carried out in static mixers. Organic solvents or water, dispersants, emulsifiers, surfactants or wetting agents, dyes, etc. are used as formulants. Pelliculants are used to apply a microporous film to the surface of the seed. They make it possible to improve the coverage of the seed and the homogeneity of the coverage by the active substance. They can also facilitate the flow of the seed in the seeder. Coatings can change the shape, size and/or weight of the seed, thus improving seeding accuracy. A brown algae extract can be incorporated into this coating. A single layer coating can be applied or the coating steps can be repeated to obtain a multi-layer coating and thus increase the dose to obtain an optimum dose. The coating can also contain other elements such as phytosanitary treatments.

The invention also relates to a method for improving the growth of plants comprising the step of administering a brown algae extract as described above or a biostimulant composition containing said extract to the medium on which the plants are grown.

The volumes of application directly into the soil are dependent on the concentration of active components from the extraction. The dilution rates per volume of water will however be in the range of 0.05% to 5% (0.5 g/L to 50 g/L dry extract), more particularly 0.1 to 2% (1 g/L to 20 g/L dry extract) to ensure an effect on bacterial growth.

The brown algae extract or biostimulant composition can also be applied by infiltration into the soil, by spraying on the leaves of the plant, by application on a seed before sowing or on the roots of a seedling, in particular by root-dipping, before planting.

A root-dipping composition may contain the brown algae extract, as well as any other compound known in the art, such as a non-phytotoxic hydrophilic polymer, including polyvinyl alcohol, polyvinyl pyrrolidone, polyacrylamide, polyvinyl acetate, polyvinyl propionate, hydroxypropyl methyl cellulose, methyl cellulose or carboxymethyl cellulose. Gums may also be used in pralines formulations, in particular xanthan gum or arabic gum. Starch, in particular copolymers of starch with acrylamides, may also be used.

The invention also relates to a method for enhancing the growth of bacteria, comprising the step of administering a brown algae extract as described above into the culture medium of the bacteria.

The invention also relates to an extract of brown algae as described above as a biostimulant, or as a fertilizing agent. It is recalled that a fertilizing agent is a substance, used in agriculture, horticulture and forestry, which makes it possible to improve the soil, in particular its structure, and to fertilize cultivated plants. In the present case, the extract does not directly provide the nutrients necessary for plants, but allows for the improvement of soils due to the increase in the growth of favorable bacteria capable of improving the growth of plants.

The invention also relates to a biostimulant or fertilizer composition comprising a brown algae extract as described above, as well as to the use of such a brown algae extract for the preparation of a biostimulant or fertilizer composition.

FIGURES

FIG. 1: Growth curve of a *Bacillus megaterium* strain in the presence of the extract generated at different concentrations FIG. 2: Growth curve of a *Pseudomonas fluorescens* strain in the presence of the extract generated at different concentrations FIG. 3: Growth curve of a *Pseudomonas fulva* strain in the presence of the extract generated at different concentrations FIG. 4: Enumeration of bacterial colonies formed in solid medium in the presence of the extract generated at different concentrations.

Figure 5:
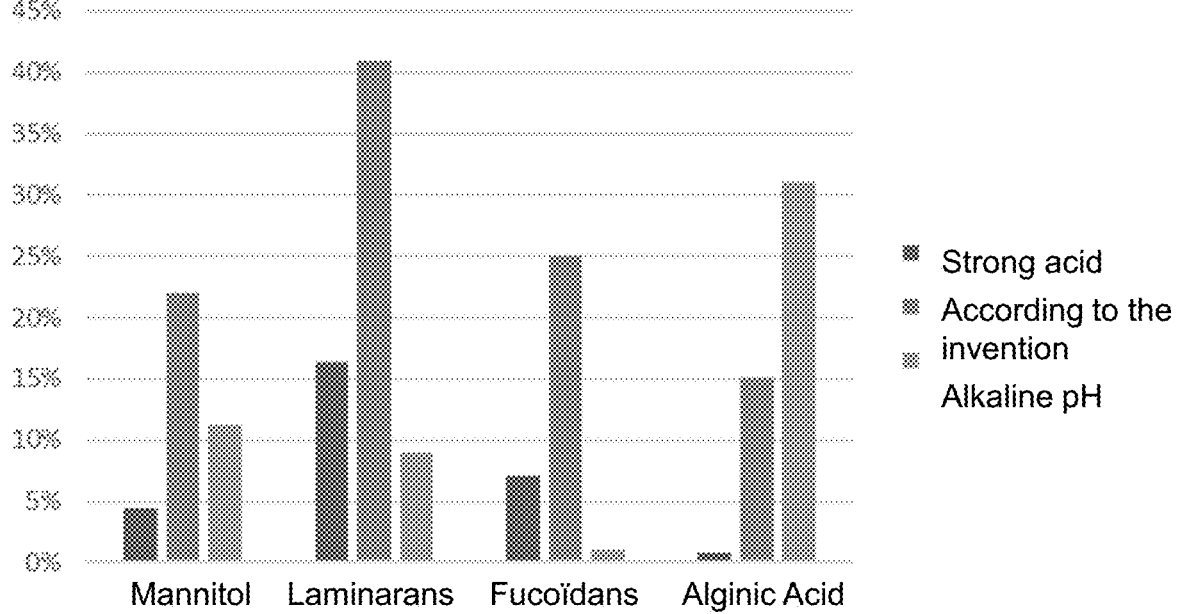

FIG. 5: Compositions of extracts obtained under different pH conditions. Left bars: extraction with a strong acid (similar to that described in FR3025699A); middle bars: extraction with a weak acid according to the invention; right bars: extraction in alkaline medium (similar to that described in GB2408045A).

EXAMPLES

Example 1. Production of Algae Extract

The extractions were carried out using dry seaweed of the *laminaria* type (*Laminaria*).

A solution of 4% citric acid (120 g) in a volume of 3l of water previously heated to 70° C. was prepared and then 300 g of crushed dry seaweed was incorporated into this solution. It was stirred and maintained at 70° C. with a stirrer for 3 h, then the solution was centrifuged to recover the liquid fraction (crude extract). The centrifugation supernatant was then concentrated to a volume concentration factor of 5 before being precipitated by two volumes of absolute alcohol (ethanol) previously cooled to −20° C. After centrifugation, the precipitate obtained was dissolved in an aqueous solution (2 volumes of water for 1 volume of precipitate).

In a second example, the crude extract was treated by ultrafiltration at a cut-off of 30 kDa on a polyethersulfone membrane. The retentate is collected and is the extract used in the defined application. The permeate is not stored.

Example 2. Analysis of Extracts

The redissolved water extracts were analyzed.
For one extract, the following composition was found:
Inorganic matter=11.81% DW (dry matter)
Mannitol=22.29% DW
Fucoidans=25.61% DW
Laminarans=41.86% DW The percentages of the different compounds were similar for other extracts, obtained from dry or fresh algae regardless of the purification technique used (see example 1).

Extracts were obtained using methods similar to those described in FR3025699A and GB2408045A. Analysis of the extracts obtained shows that the composition differs depending on the extraction method (FIG. 5). The compounds were extracted using a temperature maintained at 70° C. for 3 hours and separation of the insoluble fraction by centrifugation at 4000 rpm for 15 minutes. The extraction solvent, including its pH, was varied by performing a strong acid extraction with pH adjusted with sulfuric acid and an alkaline extraction by adjusting the pH to 11 with potash.

It is observed that the extraction according to the method according to the invention increases the level of mannitol, laminarans and fucoidans in the algae extract obtained.

Example 3. Growth in Liquid Medium

The effect of the addition of algae extracts to a solid culture medium on the growth kinetics of seven bacterial species with a recognized PGPR (Plant-Growth Promoting Rhizobacteria) effect was determined: *Bacillus megaterium, Bacillus subtilis, Rhizobium leguminosarum, Azotobacter vinelandii, Pseudomonas fluorescens, Pseudomonas fulva, Arthrobacter agilis.*

Nutrient broth NB culture medium (Sigma-Aldrich) at 25 g/L was used for the multiplication of the following bacteria: *Bacillus subtilis, Bacillus megaterium, Arthrobacter agilis, Pseudomonas fluorescens, Pseudomonas fulva.* YMA medium (Sigma-Aldrich) without agar was used for *Rhizobium leguminosarum* bacteria.

Tests in sterile 96-well round-bottom microplates were performed. An absorbance of 0.06 to 0.08 (600 nm) for inoculation of the bacteria into the microplate was used in these tests.

Microplate plating included a blank, a positive control, a negative control and the samples.
Positive Control The positive control was composed of bacteria and optimum culture medium (nutrient broth NB), in order to verify good multiplication of the bacteria in the microplates.
Negative Control The negative control consisted of sterilized distilled water devoid of carbonaceous elements with 20 μl of bacteria inoculated with their NB culture medium, in order to determine how bacterial growth behaved in a medium depleted of any carbonaceous elements.
White The blank was distilled water without bacteria in order to determine possible variations in absorbance and potential bacterial contamination.

Samples

The different algal extract tests consisted of sterile distilled water with the tested solutions at different concentrations (66 μl) to which 20 μl of bacteria were added.

The different seaweed extracts tested are: commercial mannitol, commercial laminarans, composition according to the invention (laminarans extract).

Figure 2:
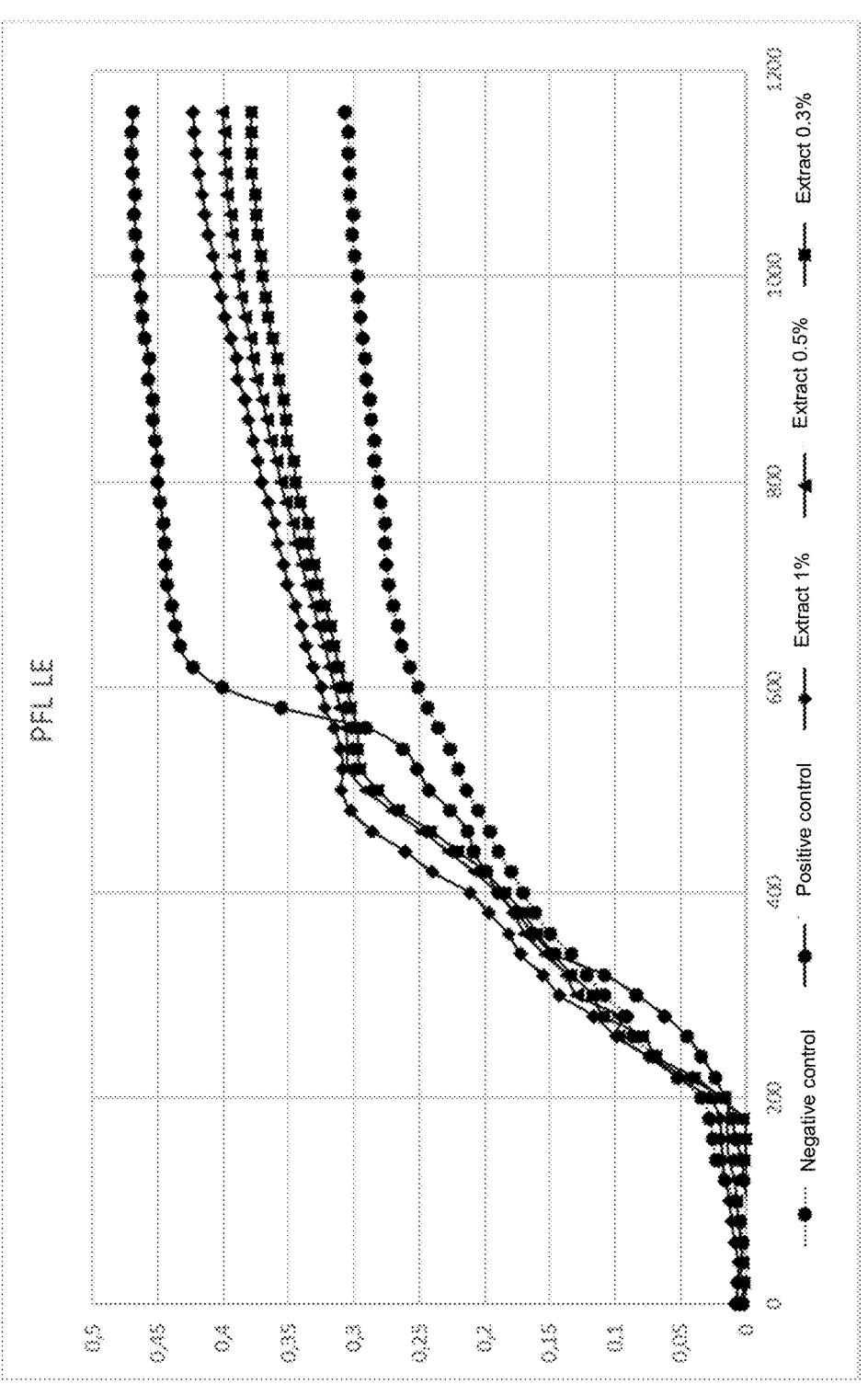
Figure 3:
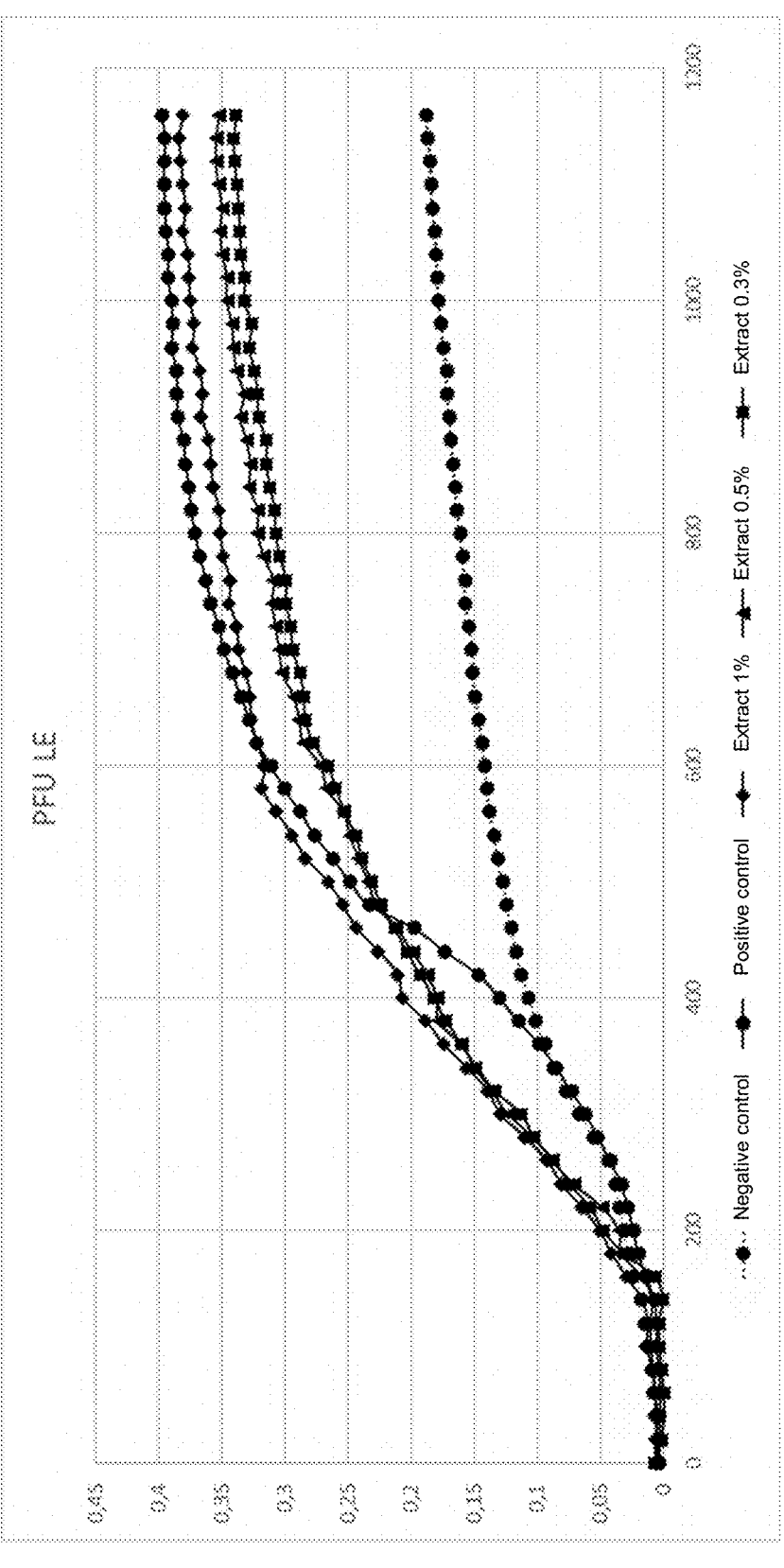
Figure 4:
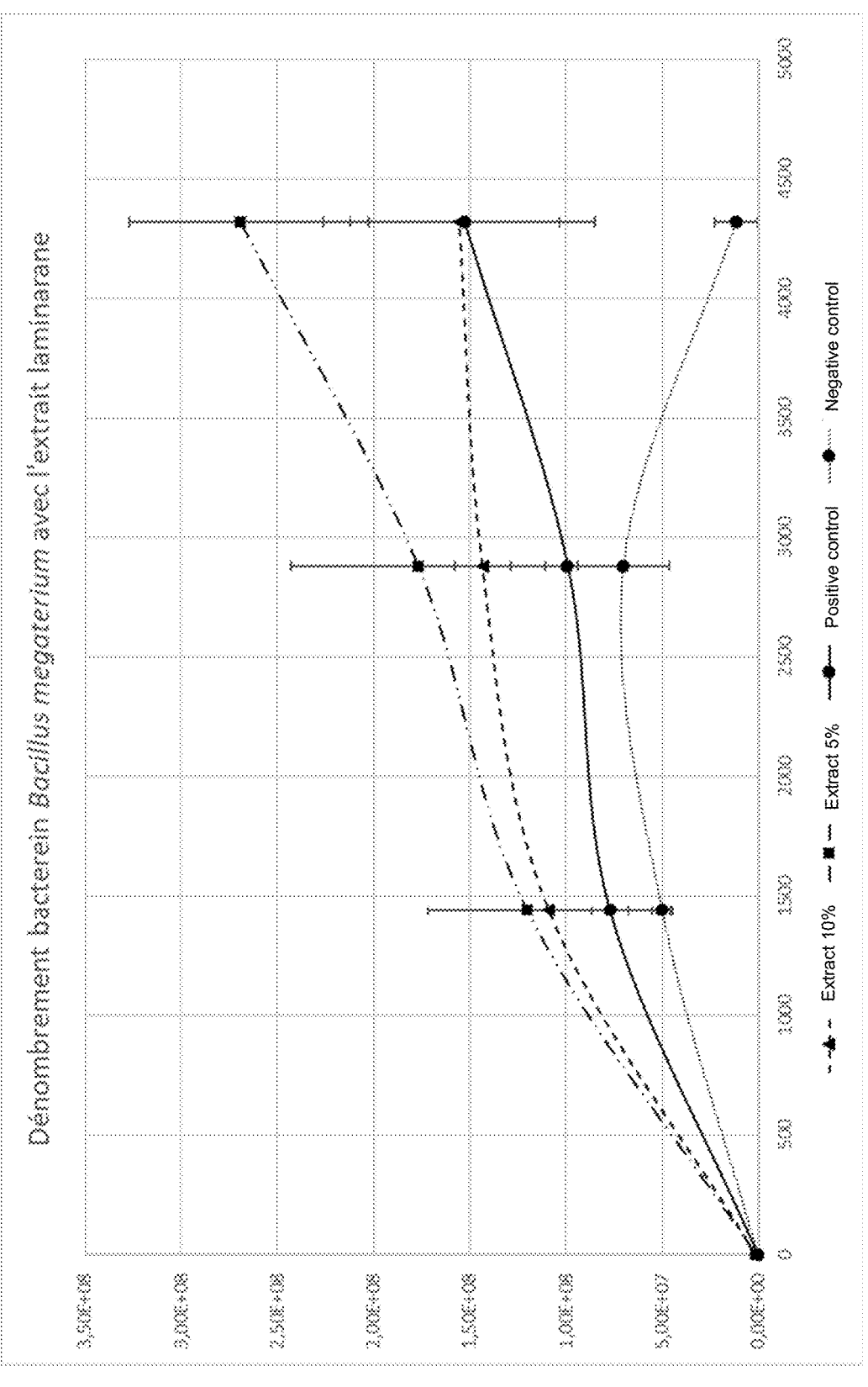

FIGS. 1 to 3 show a growth of bacterial strains in liquid medium using only the generated extract as carbon source for different bacteria.

The tests showed that the bacteria were able to multiply with the algal extracts as the only carbon source, creating a bacterial growth kinetic. Indeed, a concentration of the extract at 0.5% allows a growth approaching the optimal conditions of growth (positive control) and also shows a growth significantly higher than the negative control (without carbon source).

The use of purified mannitol (99% pure commercial mannitol) or standard laminaran (99.8%) showed a positive interaction between bacteria and compounds (growth curve between the negative and positive control) only for concentrations at 1% for *Bacillus megaterium, Pseudomonas fluorescens* and *Pseudomonas fulva* and an absence of interaction between bacteria and compounds (growth curve below the negative control) for concentrations at 0.5% and 0.3%.

Different purified extracts were tested for their ability to be used as a carbon source. When laminarans are used alone, it was observed that they can be used as a carbon source (increase in bacterial growth) for concentrations starting at about 1%. It was also observed that the higher the concentration, the greater the effect.

When mannitol is used as the sole source of carbon, a maximum effect was observed for a concentration of 1%, but very little or no effect was observed for lower concentrations (0.1%) or higher concentrations (2%).

Fucoidans did not seem to show any real positive effect on bacterial growth, especially when the concentration was above 0.1%. However, a small improvement in growth was observed for concentrations in the range of <0.01%.

Alginates showed little effect on bacterial growth.

A commercial brown algae extract (ALGANACT™ EVP6 Ld of the Applicant), containing the same compounds as those of the invention, but in different proportions (Mannitol: 10-11%; Fucoidans: 2.5-3%; Laminarans: 5-5.5%; Alginates: 24-25%; other organic compounds (peptides, lipids, pigments, amino acids . . . ): 21.5-22.5%; inorganic compounds: 34-35%), did not show beneficial effects for bacterial growth.

As shown above, the compositions according to the invention are effective when used at a concentration of 0.5%, corresponding to concentrations below the efficacy concentrations for the individual compounds, thus showing some synergy between the components. The concentrations obtained in the extracts according to the invention, as well as the ratios between each component, thus appear to be optimal for obtaining an improvement in bacterial growth, which will be beneficial to plant growth, due to the favorable action of the bacteria.

Example 4. Growth in Solid Media

The use of exfoliated natural mineral vermiculite simulates growth in a solid medium.

Four algae extracts and four bacteria were used.

The extract was tested at two different concentrations, 5% and 10%. Two complementary experiments were carried out in parallel: the counting of bacteria at given times and the quantification of the amount of carbon used by the bacteria to grow.

In these experiments, 4 g of sterile vermiculite (sieved to 2 mm to homogenize volume and texture) in 40 ml jars with the addition of the desired medium were tested. The seven algal extracts tested separately in water, the positive control represented by nutrient broth (NB) medium, the negative control represented by water alone and the blank represented by water without bacteria.

Positive Control

The positive control was composed of bacteria and optimum culture medium diluted to ⅕ (nutrient broth NB), in order to verify that the bacteria multiply in solid vermiculite soil conditions.

Negative Control

The negative control was composed of sterilized distilled water devoid of carbonaceous element with 2 ml of bacteria inoculated with their culture medium NB diluted at ⅕, in order to determine how the bacterial growth behaves in solid medium in a medium depleted in any carbonaceous element.

White

The blank was distilled water without bacteria in order to determine possible variations in absorbance and potential bacterial contamination.

Samples

The different algal extract tests were composed of sterile distilled water with the tested solutions at different concentrations with a constant volume of 6.6 ml and 2 ml of bacteria.

The measurements were made after four incubation times, T0h, T24h, T48h and T72h.

The seaweed extract solutions were diluted to 1% for standard mannitol (MS) and commercial alginate (AC) and to 2% for standard laminarane (LS) and composition according to the invention (laminarans extract (LE)).

Bacterial enumeration was performed using 5 g of each jar, added to a tube containing 45 ml of physiological water (9 g NaCl to 1 l water). Dilutions were performed at $10^{-2}$, $10^{-3}$, $10^{-4}$ (T0h) and $10^{-5}$, $10^{-6}$ and $10^{-7}$ (other times) in 900 µL of physiological water with a cascade dilution by taking 100 µL of the previous solution. 100 µL of each dilution was spread on R2A medium and colonies were counted after incubation for 48 h.

The quantification of carbon was carried out with a conductivity meter allowing the measurement of electrical and thermal conductivity. Organic carbon is mineralized in the form of $CO_2$ trapped by sodium hydroxide. Carbon trapping was carried out with 0.5N sodium hydroxide to trap the carbon released by the bacteria. The measured conductivity reflects the amount of carbon trapped.

At the end of the experiment, the composition according to the invention shows a growth of the *Bacillus megaterium* bacteria which is greater than the growth observed without extract (0) and with a standard extract (LS extract).

Example 5. Growth In Vivo

In vivo experiments are carried out in the greenhouse. The trial is conducted in the greenhouse on lettuce plants.

The trial was conducted with 7.5 L pots.

The fertilization is fixed beforehand without any additions during the trial.

Beneficial bacteria were added to the soil by watering at the beginning of the trial.

The selected bacteria are *Bacillus megaterium, Pseudomonas fulva* and *Rhizobium leguminasorum*.

The seaweed extracts were applied by watering on a weekly basis.

Targeted detection and quantification (qPCR) tests for these beneficial bacteria have been developed.

In parallel, a molecular quantification test of the total bacterial biomass present in a sample (16S marker) was also used in this study.

The algal extract solutions were diluted to 2% for the standard laminarans (LS) and the extract according to the invention.

Plants

Stage on soil with lettuce plants:

The trial was organized in 3 modalities with 10 independent replicates of one plant.

The two extracts, applied with 3 beneficial bacteria evaluated during the trial, were compared to 1 control modality: contribution of the bacteria alone.

The terms and conditions are as follows:

TABLE 1

| Experimental procedures | | | | | |
|---|---|---|---|---|---|
| Modality | Bare soil/ With plant | Treatment % | Bacteria | Analysis Markers | Plant parameter |
| 1 | With Plant | Extract 1 30% of the total | Mix 3 bacteria | 4 kinetic points (during and at the end of the trial): 16S and 3 target markers | Fresh weight Dry matter |
| 2 | With Plant | Extract 2 30% of the total | Mix 3 bacteria | 4 kinetic points (during and at the end of the trial): 16S and 3 target markers | Fresh weight Dry matter |
| 3 | With Plant | Water | Mix 3 bacteria | 4 kinetic points (during and at the end of the trial): 16S and 3 target markers | Fresh weight Dry matter |

The first results show an improvement in plant growth.

The invention claimed is:

1. A brown algae extract comprising between 15 and 25% of mannitol, between 35 and 45% of laminarans, and between 20 and 30% of fucoidans, wherein the percentages are based on total weight of dry matter of the brown algae extract.

2. A brown algae extract according to claim 1, in the form of an aqueous solution or a powder that is soluble in an aqueous medium.

3. A process for obtaining the brown algae extract according to claim 1 comprising:
   a. grinding a brown algae sample to obtain a ground material,
   b. suspending the ground material and incubating it in an acidic solution for a period of more than 2 hours,
   c. recovering a liquid fraction comprising the brown algae extract, and
   c'. further extracting the extract.

4. The method according to claim 3, wherein extracting the extract comprises:

d. generating a precipitate by adding alcohol to the liquid fraction recovered in c., e. recovering the precipitate, and f. suspending the precipitate in an aqueous solution, drying the precipitate, and/or freeze-drying the precipitate.

5. The method according to claim 3, wherein extracting the extract comprises:

d. filtrating the liquid fraction recovered in c., e. recovering a retentate after filtration in d., f. suspending the precipitate in an aqueous solution, drying the precipitate, and/or freeze-drying the precipitate.

6. The method according to claim 3, wherein the brown algae sample of a. is a dry brown algae sample.

7. The method according to claim 3, wherein the acidic solution is a citric acid solution or isocitric acid solution.

8. The method according to claim 3, wherein the incubation is carried out at a temperature of between 55° C. and 80° C.

9. A method for improving growth of plants comprising administering the brown algae extract according to claim 1 to the medium in which the plants are grown.

10. A method for enhancing the growth of bacteria comprising administering the brown algae extract according to claim 1 into the culture medium of the bacteria.

11. A biostimulant or fertilizer composition comprising the brown algae extract according claim 1 and an excipient or other active ingredient.

12. A method for preparing a biostimulant or fertilizer comprising combining the brown algae extract of claim 1 with an excipient or another active ingredient.

* * * * *